United States Patent [19]
Karie et al.

[11] 3,858,914
[45] Jan. 7, 1975

[54] TRANSITION PIPE CONNECTION

[75] Inventors: Earl K. Karie, Detroit; Manfred K. Kuttruff, Sterling Heights, both of Mich.

[73] Assignee: Brass Craft Manufacturing Company, Detroit, Mich.

[22] Filed: July 25, 1973

[21] Appl. No.: 382,603

[52] U.S. Cl................... 285/238, 29/508, 29/511, 29/520, 285/174, 285/382, 285/423
[51] Int. Cl............................................ F16l 47/00
[58] Field of Search ........... 285/174, 423, 382, 187, 285/177, 238; 339/94 R; 29/511, 520, 508; 403/274; 151/7

[56] References Cited
UNITED STATES PATENTS

| | | | |
|---|---|---|---|
| 1,957,397 | 5/1934 | Stitt | 29/511 X |
| 2,632,431 | 3/1953 | Suter | 285/382 X |
| 2,776,151 | 1/1957 | Harkenrider | 285/174 |
| 2,856,452 | 10/1958 | Appleton et al. | 339/94 R X |
| 3,236,543 | 2/1966 | Mueller | 285/174 X |
| 3,287,034 | 11/1966 | Bragg | 285/382 X |
| 3,363,680 | 1/1968 | Baker | 285/382 X |

FOREIGN PATENTS OR APPLICATIONS

| | | | |
|---|---|---|---|
| 1,262,699 | 4/1961 | France | 285/174 |
| 279,752 | 11/1967 | Australia | 285/174 |

*Primary Examiner*—Thomas F. Callaghan
*Attorney, Agent, or Firm*—Cullen, Settle, Sloman & Cantor

[57] ABSTRACT

This disclosure relates to transition connections for plastic pipe, including a metal coupling and an annular plastic insert or ferrule. The coupling may be a connector or fitting for a metal pipe or a metal valve or the like. The coupling has a bore which receives and retains the plastic ferrule and the pipe is inserted and retained in the annular ferrule. In the improved transition connection, the plastic insert is retained in the coupling bore by deforming or rolling over the end of the coupling into the bore to resiliently bias the end of the insert against an abutment wall, securely retaining the insert and permitting relative thermal expansion. The disclosed thermal connection eliminates the requirement for a compression nut or the like and permits direct connection between a plastic pipe and a metal fitting or valve.

3 Claims, 4 Drawing Figures

PATENTED JAN 7 1975

3,858,914

TRANSITION PIPE CONNECTION

FIELD OF THE INVENTION

The disclosed invention relates generally to pipe joints or couplings and more particularly to a coupling between a non-metal pipe and a metal fitting or pipe, wherein the pipe and fitting have different coefficients of thermal expansion.

The utilization of non-metal or plastic pipe in home and industrial applications is becoming increasingly more frequent. In certain applications, such as in water pipe distribution systems, a connection must be made between the plastic pipe and more conventional metal piping. Certain problems have developed, primarily because of the differences in thermal expansion and contraction between metal and non-metal piping. If a plastic threaded fitting is inserted directly into a corresponding metal fitting, for example, the differences in the coefficients of thermal expansion may cause leakage.

Various transition fittings and couplings have been suggested by the prior art to avoid these problems. U.S. Pat. No. 3,533,649, for example discloses a transition fitting or coupling which interconnects the plastic pipe to the metal piping. It has been found desirable however to avoid transition fittings by interconnecting the plastic pipe directly to a metal valve, such as toilet or water closet valves found in the home. Further, it is desirable to eliminate the requirement for a compression nut, which is required in the fitting disclosed in the above referenced patent.

SUMMARY OF THE INVENTION

The transition connection and method of this invention permits the connection of a plastic pipe, for example, directly to a metal valve, or the like, and eliminates the requirement for a compression nut. The transition connection of this invention includes a metal coupling, such as a metal valve, and an annular plastic insert or ferrule. The metal coupling has an open ended cylindrical bore terminating in an abutment wall which receives the annular ferrule. One end of the annular ferrule is disposed against the abutment wall and the opposed end is adjacent the open end of the bore. The requirement for a compression nut is eliminated by deforming the end of the coupling into the bore to form a continuous annular end portion engaging the ferrule end and resiliently biasing the ferrule against the abutment wall. The ferrule is thereby securely retained within the coupling bore while permitting relative thermal expansion of the ferrule.

In the disclosed embodiment, the ferrule includes a resilient O-ring which is received within an annular groove in the ferrule. The O-ring has an outer diameter greater than the outer diameter of the cylindrical ferrule and less than the internal diameter of the coupling bore. The O-ring is thus resiliently biased against the internal diameter of the coupling bore to seal the insert within the coupling. In the preferred embodiment, the O-ring also extends beyond the end of the ferrule and is resiliently biased against the abutment wall by the annular end portion of the coupling.

In the preferred embodiment of the metal coupling, the bore includes a conical chamfer which resiliently compresses the ferrule O-ring as the ferrule is inserted into the coupling bore. The conical chamfer also forms part of the annular end portion of the coupling, defining an arcuate distal end biased against the end of the plastic ferrule.

The plastic pipe is inserted within the bore of the annular plastic insert or ferrule and secured to the ferrule by any suitable means, such as solvent welding. In the preferred embodiment, the plastic pipe and insert are of similar chemical compositions having similar coefficients of thermal expansion.

Other advantages and meritorious features of the transition connection and method of this invention will be apparent from the following description of the preferred embodiment and method of this invention and drawings. It will be understood that various modifications may be made to the preferred embodiment without departing from the purview of the appended claims.

DESCRIPTION OF THE PREFERRED EMBODIMENT AND METHOD OF THIS INVENTION

Figure 2:
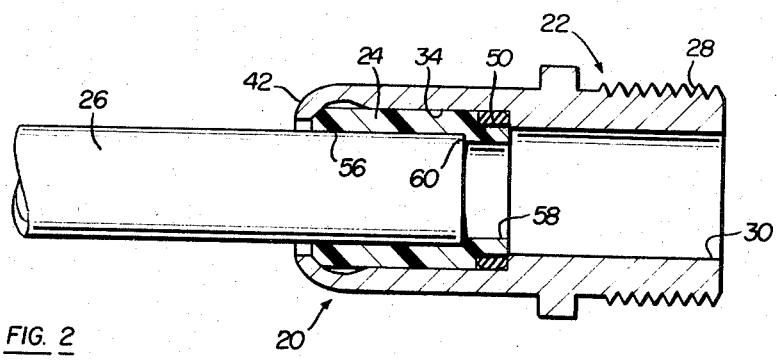
FIG. 2 is a partial cross-sectional view of one embodiment of the transition connection of this invention utilizing the ferrule and fitting disclosed in FIG. 1.

The disclosed embodiment of the transition connection 20 shown in FIG. 2 includes a metal coupling or fitting 22, a plastic insert or ferrule 24 and a plastic pipe 26. The disclosed fitting 22 includes an externally threaded end 28 which may be utilized to secure the coupling to a metal pipe by conventional means and an axial fluid passage or bore 30. It is understood that the threaded end of the coupling will depend upon the particular application and that the transition connection of this invention is adapted to be utilized with any conventional coupling or fitting, including valves and the like.

Figure 1:
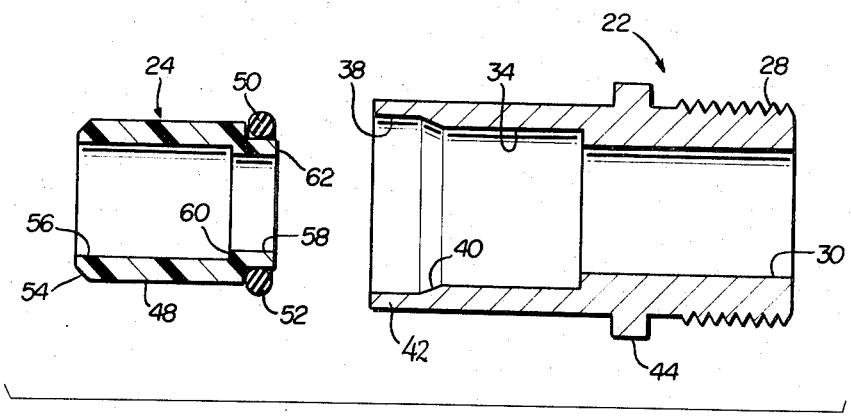
FIG. 1 is a side cross-sectional view of one embodiment of the metal fitting and ferrule of this invention.
Figure 4:
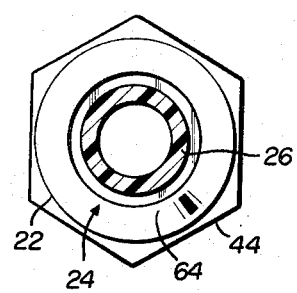
FIG. 4 is an end view of the transition connection shown in FIG. 2.

The opposed end of the coupling includes a bore 34 adapted to receive the ferrule 24 and having a larger diameter than the fluid passage 30 to define an abutment wall 36. The abutment wall faces the enlarged cylindrical opening 38 which is joined to the bore 34 by a chamfer 40, as shown in FIG. 1. The enlarged opening 38 also defines a reduced cylindrical end portion of the coupling. In the disclosed embodiment, the coupling includes a wrench flat or hexagonal projection 44, as shown in FIGS. 1 and 4 to aid in the securement of the coupling to a second member, not shown.

The plastic ferrule 24 includes a cylindrical external surface 48 which is closely received within the cylindrical bore 34 of the coupling, as shown in FIG. 2 and a resilient O-ring 50 which is received within an annular groove 52 opening radially outwardly and toward the abutment wall 36 of the coupling. The opposed end of the plastic ferrule includes a chamfer 54 for reasons given hereinbelow. The disclosed embodiment of the plastic ferrule includes an axial bore 56 adapted to receive the pipe 26, as shown in FIG. 2, and a smaller fluid passage 58 defining an abutment wall 60.

It is understood that the materials for the elements of the transition connection of this invention will depend upon the particular application, however in the preferred embodiment, the ferrule 24 and the pipe 26 are formed of a plastic material which is relatively inert to chemical attack, is relatively light and has suitable strength characteristics for piping applications. The fitting or coupling 22 is preferably formed of a metal, such as normally encountered in piping applications and therefore has a different coefficient of thermal expansion than the plastic ferrule and pipe. Further, the plastic ferrule and pipe are preferably formed of plastics having similar chemical compositions, such that the coefficient of thermal expansion is the same or similar. The O-ring 50 is preferably a resilient plastic material, such as neoprene or other synthetic rubber materials.

A suitable material for the plastic ferrule and pipe is chlorinated polyvinyl chloride (CPVC) or unplasticized polyvinyl choride (PVC). Chlorinated polyvinyl chloride has the basic product characteristics of PVC with the additional advantage of greater strength at elevated temperatures. Other suitable plastic materials may also be utilized depending on the particular application. The fitting or coupling 22 may be formed from any suitable metal material normally associated with plumbing applications, including brass or iron.

The transition connection 20 shown in FIG. 2 is assembled by first inserting the plastic ferrule 24 in the coupling bore 34. As shown in FIG. 1, the cylindrical external surface 48 of the ferrule has substantially the same outside diameter as the internal diameter of the bore 34. The relaxed outside diameter of the O-ring 50 is however greater than the internal diameter of the bore, such that the O-ring is compressed during insertion of the ferrule in the coupling bore. The compression of the O-ring is aided by the enlarged opening 38 and the chamfer 40. As the adapter is inserted into the bore 34, the O-ring is closely received within the enlarged opening 38 and then compressed by the conical chamfer 40, reducing damage to the O-ring during assembly. The ferrule is urged into the coupling bore 34 until the end 62 engages the abutment wall 36 of the coupling, as shown in FIG. 2. In this position, the O-ring 50 is compressed radially to seal against the internal surface 34 of the bore and axially relative to the ferrule to resiliently engage the abutment wall 36, providing a second seal which is not found in the prior art. The sealing of the O-ring against the abutment wall is increased when the ferrule is secured in place, as described hereinbelow.

Figure 3:
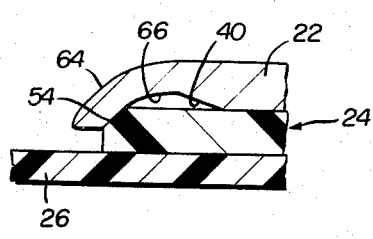
FIG. 3 is an enlarged cross-sectional view of FIG. 2.

In the preferred embodiment of the transition connection and method of this invention, the reduced cylindrical end 42 of the coupling is deformed, after insertion of the plastic ferrule 24, to form a continuous annular end portion 64 engaging the end 54 of the ferrule to (1) resiliently bias the ferrule against the abutment wall 36 of the coupling, (2) securely retain the ferrule within the coupling bore 34, and (3) permit relative thermal expansion of the ferrule within the coupling bore. The end 64 of the ferrule may be deformed in a suitable die having a conical opening, for example, or the end may be spun over by conventional methods. As shown in FIG. 3, the deformed end portion of the coupling resiliently biases the ferrule and defines a "Bellville" type spring. The internal surface of the deformed end portion includes the conical chamfer 40 and an arcuate surface 66 engaging the chamfer 54 of the ferrule. The internal surface of the lip is generally parallel to the conical chamfer as shown in FIG. 3. The chamfer therefore serves two functions, including resiliently compressing the O-ring 50, as described above, and the chamfer serves to maintain the arcuate configuration of the end portion during deformation. It is understood that where the coupling is formed of a realtively malleable material, such as brass, the spring action is limited, however the configuration of the end portion still results in the advantages described hereinabove, including resiliently compressing the plastic ferrule 24 and O-ring 50 against the abutment wall to assure sealing of the ferrule within the coupling bore 34 and permit relative thermal expansion of the ferrule.

After securement of the ferrule 24, the plastic pipe 26 may be inserted within the ferrule, as shown in FIG. 2 and secured in place. The abutment wall 60 of the ferrule accurately positions the pipe within the ferrule. In most applications, the plastic pipe 26 must be secured within the ferrule and sealed. This may be accomplished by any suitable means, including solvent bonding or welding. A suitable solvent for chlorinated polyvinyl chloride is "CPVC Solvent Cement" sold by Amoco Chemicals Corporation, which contains tetrahydrafuran. The solvent is applied to either the internal diameter of the bore 56 or the external diameter of the pipe 26, or both, and the pipe is inserted within the ferrule, securely retaining and sealing the pipe to the ferrule. It is understood that other suitable solvents may also be utilized and may be required depending upon the composition of the pipe and plastic ferrule.

Another advantage of rolling over or spinning the end of the coupling to secure the ferrule in place is that the coupling may be chrome plated before the end of the coupling is formed. If the coupling is plated after rolling, the chromic solution will build-up beneath the rolled edge and may cause leakage. Staking or other means of securing may damage the plating, permitting corrosion at the damaged points.

We claim:

1. A coupling comprising a tubular metal body and a tubular non-metallic plastic insert, said body having a cylindrical bore opening through one end of said body and terminating in an abutment wall facing said opening, said tubular plastic insert received within said bore and abutting said wall, said one body end terminating in an annular lip portion having a reduced wall thickness, the internal diameter of said lip portion being greater than the diameter of said cylindrical bore and also greater in diameter than the external diameter of said insert, said lip portion encircling said bore and extending inwardly to engage one end of said insert, said one insert end having a conical chamfer surface at the radial outer edge, the inner surface of said lip portion adjacent said one insert end radiused outwardly and radially spaced from said insert, terminating in an inwardly radiused portion engaging said chamfer surface of said insert, said one end of said body including said lip portion having a relatively smooth annular uninterrupted exterior surface, said lip portion thereby defining an annular spring means resiliently compressing said plastic insert against said abutment wall and permitting thermal expansion of said insert, said insert having an internal bore adapted to receive a nonmetallic plastic pipe to be secured thereto.

2. The coupling defined in claim 1, characterized in that said plastic insert includes an external annular groove and a continuous resilient O-ring received within said annular groove and resiliently biased against the internal wall of said bore to provide sealing engagement.

3. The coupling defined in claim 1, characterized in that said inwardly radiused interior surface of said lip portion is generally parallel to and biased against said chamfer surface on said one end of said tubular insert.

* * * * *